(12) United States Patent
Chen et al.

(10) Patent No.: US 11,792,152 B1
(45) Date of Patent: Oct. 17, 2023

(54) AUTOMATIC DETECTION-BASED IP ALLOCATION

(71) Applicant: Dell Products L.P., Round Rock, TX (US)

(72) Inventors: Baoli Chen, Shanghai (CN); Bruce Bin Hu, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/723,865

(22) Filed: Apr. 19, 2022

(30) Foreign Application Priority Data

Apr. 2, 2022 (CN) .......................... 202210353099.8

(51) Int. Cl.
*H04L 61/103* (2022.01)
(52) U.S. Cl.
CPC .................................. *H04L 61/103* (2013.01)
(58) Field of Classification Search
CPC .......................... H04L 61/103; H04L 63/1441
USPC ........................................................ 709/245
See application file for complete search history.

(56) References Cited

U.S. PATENT DOCUMENTS

| | | | |
|---|---|---|---|
| 2004/0103314 A1* | 5/2004 | Liston | H04L 63/1408 726/23 |
| 2014/0192810 A1* | 7/2014 | Hikichi | H04L 45/126 370/392 |
| 2021/0216234 A1* | 7/2021 | Singler, Jr. | G06F 9/45558 |
| 2022/0272110 A1* | 8/2022 | Agrawal | H04L 63/10 |

* cited by examiner

*Primary Examiner* — Sibte H Bukhari
(74) *Attorney, Agent, or Firm* — Jackson Walker L.L.P.

(57) ABSTRACT

An information handling system may include at least one processor and a memory. The information handling system may be configured to receive a plurality of address resolution protocol (ARP) packets based on requests that have been transmitted from a provisioning system to a plurality of network addresses; based on contents of the plurality of ARP packets, determine one of the plurality of network addresses as a potential network address; based on the contents of the plurality of ARP packets, determine a potential gateway address; and use the potential network address to attempt to communicate with the provisioning system via the potential gateway address.

18 Claims, 2 Drawing Sheets

AUTOMATIC DETECTION-BASED IP ALLOCATION

TECHNICAL FIELD

The present disclosure relates in general to information handling systems, and more particularly to techniques for allocating IP addresses.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on standard, off-the-shelf servers. One type of HCI solution is the Dell EMC VxRail™ system. Some examples of HCI systems may operate in various environments (e.g., an HCI management system such as the VMware° vSphere® ESXi™ environment, or any other HCI management system).

In the HCI context (as well as other contexts), information handling systems may execute virtual machines (VMs) for various purposes. A VM may generally comprise any program of executable instructions, or aggregation of programs of executable instructions, configured to execute a guest operating system on a hypervisor or host operating system in order to act through or in connection with the hypervisor/host operating system to manage and/or control the allocation and usage of hardware resources such as memory, central processing unit time, disk space, and input and output devices, and provide an interface between such hardware resources and application programs hosted by the guest operating system.

In the HCI context (as well as other contexts), new information handling systems may sometimes need to be deployed at remote sites. Such remote sites often do not have local professional maintenance engineers, and so an automated deployment solution can significantly reduce operation costs. Such a deployment solution may include generating a network configuration, such as assigning internet protocol (IP) addresses to systems, configuring a netmask, configuring a gateway IP address, etc.

Accordingly, embodiments of this disclosure may allow for remote deployment with a flexible, automatic network configuration in the absence of DHCP (which is not always available at a remote site). One embodiment allows for temporary IP parameters to be configured on new remote nodes automatically, which can then be used for further remote configuration. Some embodiments may be employed in the HCI context, while others may be employed in other contexts.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with remote configuration of networking may be reduced or eliminated.

In accordance with embodiments of the present disclosure, an information handling system may include at least one processor and a memory. The information handling system may be configured to receive a plurality of address resolution protocol (ARP) packets based on requests that have been transmitted from a provisioning system to a plurality of network addresses; based on contents of the plurality of ARP packets, determine one of the plurality of network addresses as a potential network address; based on the contents of the plurality of ARP packets, determine a potential gateway address; and use the potential network address to attempt to communicate with the provisioning system via the potential gateway address.

In accordance with these and other embodiments of the present disclosure, a computer-implemented method may include: an information handling system receiving a plurality of address resolution protocol (ARP) packets based on requests that have been transmitted from a provisioning system to a plurality of network addresses; based on contents of the plurality of ARP packets, the information handling system determining one of the plurality of network addresses as a potential network address; based on the contents of the plurality of ARP packets, the information handling system determining a potential gateway address; and the information handling system using the potential network address to attempt to communicate with the provisioning system via the potential gateway address.

In accordance with these and other embodiments of the present disclosure, an article of manufacture may include a non-transitory, computer-readable medium having computer-executable instructions thereon that are executable by a processor of an information handling system for: receiving a plurality of address resolution protocol (ARP) packets based on requests that have been transmitted from a provisioning system to a plurality of network addresses; based on contents of the plurality of ARP packets, determining one of the plurality of network addresses as a potential network address; based on the contents of the plurality of ARP packets, determining a potential gateway address; and using the potential network address to attempt to communicate with the provisioning system via the potential gateway address.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
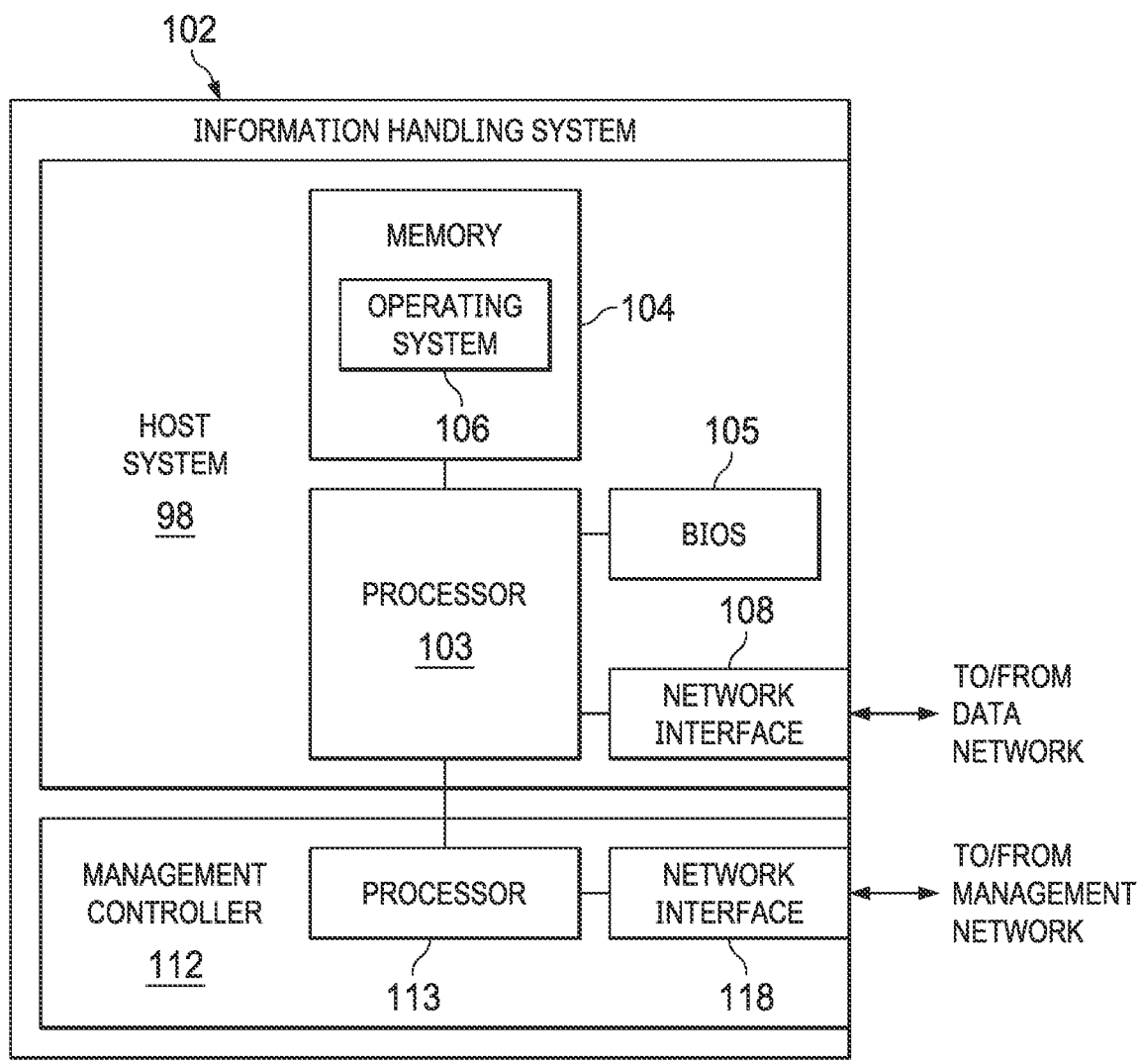
FIG. 1 illustrates a block diagram of an example information handling system, in accordance with embodiments of the present disclosure.
Figure 2:
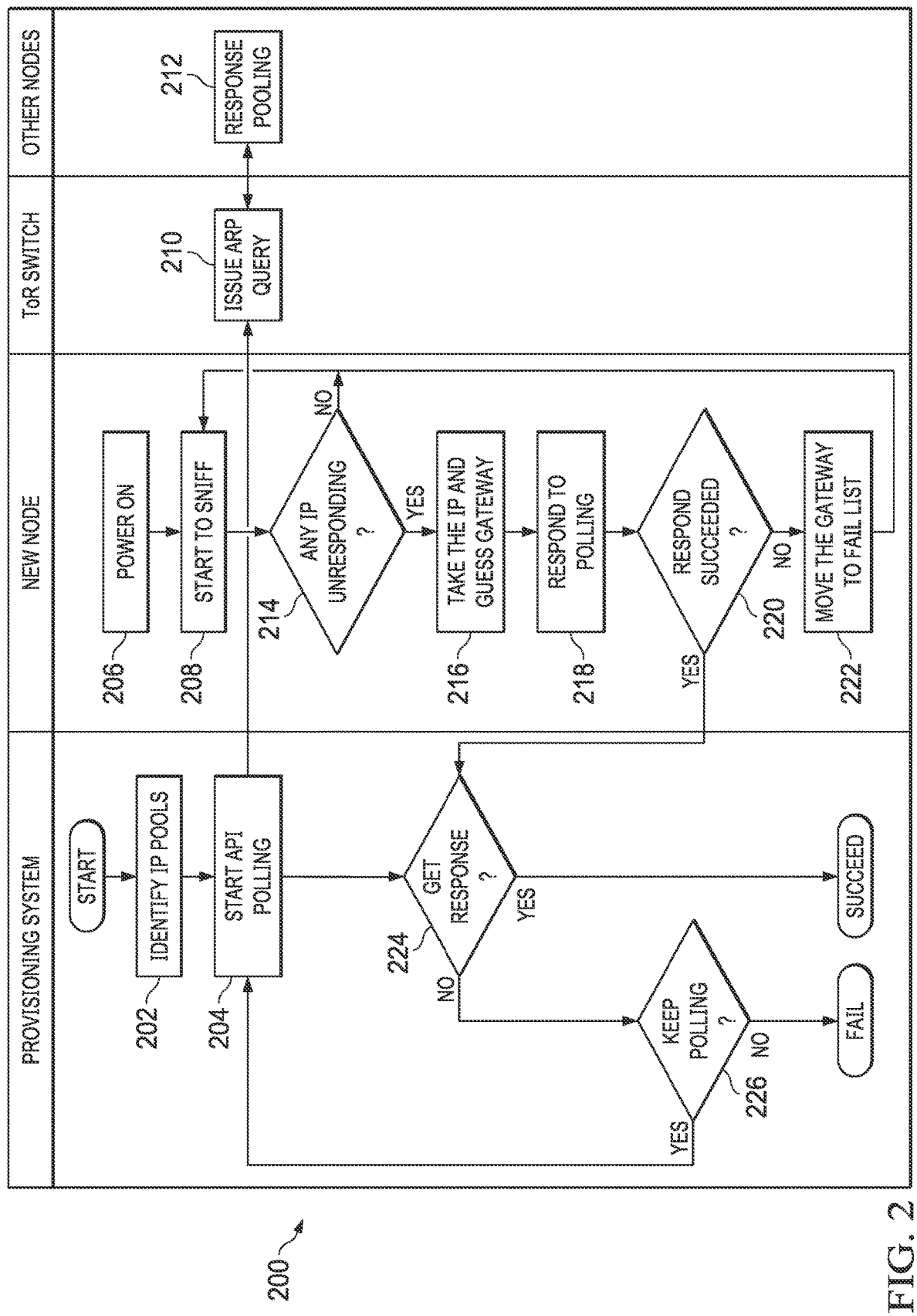
FIG. 2 illustrates an example process flow, in accordance with embodiments of the present disclosure.

Preferred embodiments and their advantages are best understood by reference to FIGS. 1 and 2, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, embodiments of this disclosure allow for remote automatic configuration of network parameters. Some embodiments may operate in the situation in which one or more new nodes have been cabled and powered on, and network devices (e.g., routers, top-of-rack (ToR) switches, and/or other switches) have been connected and configured. A provisioning system may run (e.g., at the remote site itself, on an administrator's information handling system, or on a cloud system), and it may repeatedly send requests according to a representational state transfer application programming interface (REST API) or some other API on demand of provisioning for predefined target IP pools. The provisioning system may then collect information based on the results. The target IP pool may be based on any desired criteria (e.g., it may be selected based on one or more known IP addresses for existing systems at the remote site).

Further, a node at the remote site may be configured to run a service with a sniffing component (e.g., a promiscuous-mode networking component) to sniff packets such as TCP/IP packets. In particular, the node may sniff address resolution protocol (ARP) packets as described below. ARP is a communication protocol that may be used for discovering a link layer address (e.g., a media access control (MAC) address), associated with a given internet layer address (e.g., an IP address). The sniffing component may collect information in order to help determine possible networking configuration settings (e.g., IP address, subnet, and/or gateway IP address) for new nodes. Further, a node at the remote site may be configured to execute a REST API service to respond to the calls from the provisioning system. This service may provide the fundamental hardware information about the node.

According to one embodiment, detection of available IP addresses for a new node and detection of the gateway IP address may be implemented as follows. As the provisioning system sends out API polling requests within the identified IP pool range, then these packets may be routed to the gateway that is connected to these nodes. Further, because at least some of these IP addresses are not actually in use, the gateway will not have ARP cache entries for them, and so it may send out ARP requests to try to find the MAC address for such IP addresses.

The sniffing component mentioned above may sniff and analyze the ARP queries triggered by this API polling. It may also record all the source IP addresses that are sending out ARP requests for the various destination IP addresses. The source IP address in these ARP request packets may then be assumed to be a candidates for a gateway address.

For example, if the sniffing component at a node repeatedly receives ARP request packets in the following sequence within a certain time duration, then it may assume that address A is the gateway IP, and that addresses X, Y, and Z are potentially available IP addresses:

Packet 1, Type=ARP request, source protocol address=A, Target protocol address=X Packet 2, Type=ARP request, source protocol address=A, Target protocol address=Y Packet 2, Type=ARP request, source protocol address=A, Target protocol address=X

. . .

Packet n, Type=ARP request, source protocol address=A, Target protocol address=Z According to one embodiment, detection of a possible netmask may be implemented as follows. In some embodiments, the goal in determining the netmask is to allow the new node to communicate with the provisioning system via the gateway, and there may be no need to consider enabling communication with other nodes in the same subnet. Accordingly, one embodiment may select the longest (e.g., most restrictive) netmask that is possible given the available data.

For example, if the gateway IP is 192.168.1.1 and the node IP is 192.168.1.10, then the netmask may be set to 255.255.255.240. This may or may not be identical to the value of the netmask that is configured on the interface of the gateway, but it can still be used for routing traffic correctly between the new node and the provisioning system via the gateway.

After sniffing and configuring the IP settings, the new node may still need to verify the configured IP address, because it is possible that the selected IP address or gateway is not correct. According to one embodiment, such validation may be implemented as follows.

After the IP settings have been configured, the next time that the provisioning system tries to call the REST API of the configured IP address, the new node can successfully respond to the REST call. This call and response may act as a "handshake" to confirm that the new IP address is usable and configured correctly. If the new node fails to receive an API connection request within some configured time duration, then the new node may determine that a misconfiguration has occurred and release the currently configured IP settings. The new node may then wait for a selected time duration (e.g., a random amount of time) before restarting the sniffing process again. A benefit of waiting a random duration is to avoid the duplication of IP configuration caused by multiple hosts that may select the same IP address and configure themselves identically at the same time.

Similarly, using this mechanism, if multiple hosts select the same IP address and configure themselves at the same time, then these hosts may not be able to respond to the API polling, and they will have the chance to re-select new IP addresses after waiting for the API connection to time out.

According to one embodiment, the ARP broadcast probe mentioned above may fail after a predetermined amount of time, after which the ARP entry is considered incomplete. For example, on most Linux-based systems, the probe may fail after a number of tries equal to the setting of mcast_solicit (the maximum number of attempts to resolve an address by multicast/broadcast before marking the entry as unreachable, which may default to 3). The associated time interval may be based on the setting of retrans_time_ms (the number of milliseconds to delay before retransmitting a request, which may default to 1000). Accordingly, in a default configuration, one IP address resolution may take 3*1 seconds.

In order to reduce the network bandwidth consumption, one embodiment may be configured to send out API polling for addresses in the IP pool every 10 seconds. Accordingly, if there are 50 IP addresses in the user-defined IP pool, then the provisioning system may be configured to send out polling TCP packets at the rate of 10 packets per second during the first five seconds of the polling stage, and so the gateway will send ARP requests at the same rate of 10 packets per second. The provisioning system may then poll again for unconnected addresses after 10 seconds. Ideally, a new node may be able to complete its IP configuration within one minute after the provisioning system starts polling.

Turning now to FIG. 2, a flow diagram is shown for an example method 200 for configuring network settings, according to some embodiments.

At step 202 the provisioning system may identify one or more pools of IP addresses to be tested. At step 204, the provisioning system may begin transmitting API requests to the IP addresses in the identified pool(s).

This may cause the ToR switch to begin issuing ARP queries at step 210, and one or more other nodes in the cluster may listen for responses and pool the results at step 212.

Meanwhile, the new node may be powered on at step 206 and may begin sniffing ARP packets at step 208 in promiscuous mode. If a particular IP address is not responding at step 214, then the new node may configure itself to use that IP address at step 216. Further, the gateway IP address may be inferred based on the sniffed ARP packets as discussed above. In some embodiments, the new node may also configure a netmask based on the sniffed ARP packets as discussed above.

At step 218, the new node may attempt to respond to the API polling. If the response is successful at steps 220 and 224, then the IP and gateway settings may be determined to be correct. Otherwise, the gateway address may be added to a list of failed gateway addresses at step 222, and the sniffing may resume in a loop as shown.

The method may continue until a successful set of networking settings is determined, or until a determination is made at step 226 to stop polling (e.g., based on a timeout occurring).

One of ordinary skill in the art with the benefit of this disclosure will understand that the preferred initialization point for the method depicted in FIGS. 2 and the order of the steps comprising that method may depend on the implementation chosen. In these and other embodiments, this method may be implemented as hardware, firmware, software, applications, functions, libraries, or other instructions. Further, although FIG. 2 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
at least one processor; and
a memory;
wherein the information handling system is configured to:
receive a plurality of address resolution protocol (ARP) packets based on requests that have been transmitted from a provisioning system to a plurality of network addresses;
based on contents of the plurality of ARP packets, determine one of the plurality of network addresses as a potential network address to be used by the information handling system, wherein the contents of the plurality of ARP packets indicate that the potential network address is not being used by any other information handling systems;
based on the contents of the plurality of ARP packets, determine a potential gateway address; and
use the potential network address to attempt to communicate with the provisioning system via the potential gateway address;
wherein the information handling system is not communicatively coupled to a dynamic host configuration protocol (DHCP) server.

2. The information handling system of claim 1, wherein the information handling system is a host system that has been added to a hyper-converged infrastructure (HCI) cluster.

3. The information handling system of claim 1, wherein the receiving the ARP packets takes place in a promiscuous networking mode.

4. The information handling system of claim 1, wherein the requests from the provisioning system are representational state transfer application programming interface (REST API) requests.

5. The information handling system of claim 1, further configured to determine a netmask based on the contents of the plurality of ARP packets.

6. The information handling system of claim 1, wherein the network addresses are internet protocol (IP) addresses.

7. A computer-implemented method comprising:
an information handling system receiving a plurality of address resolution protocol (ARP) packets based on requests that have been transmitted from a provisioning system to a plurality of network addresses;
based on contents of the plurality of ARP packets, the information handling system determining one of the plurality of network addresses as a potential network address to be used by the information handling system, wherein the contents of the plurality of ARP packets indicate that the potential network address is not being used by any other information handling systems;
based on the contents of the plurality of ARP packets, the information handling system determining a potential gateway address; and
the information handling system using the potential network address to attempt to communicate with the provisioning system via the potential gateway address;
wherein the information handling system is not communicatively coupled to a dynamic host configuration protocol (DHCP) server.

8. The method of claim 7, wherein the information handling system is a host system that has been added to a hyper-converged infrastructure (HCI) cluster.

9. The method of claim 7, wherein the receiving the ARP packets takes place in a promiscuous networking mode.

10. The method of claim 7, wherein the requests from the provisioning system are representational state transfer application programming interface (REST API) requests.

11. The method of claim 7, further comprising:
determining a netmask based on the contents of the plurality of ARP packets.

12. The method of claim 7, wherein the network addresses are internet protocol (IP) addresses.

13. An article of manufacture comprising a non-transitory, computer-readable medium having computer-executable instructions thereon that are executable by a processor of an information handling system for:
receiving a plurality of address resolution protocol (ARP) packets based on requests that have been transmitted from a provisioning system to a plurality of network addresses;
based on contents of the plurality of ARP packets, determining one of the plurality of network addresses as a potential network address to be used by the information handling system, wherein the contents of the plurality of ARP packets indicate that the potential network address is not being used by any other information handling systems;
based on the contents of the plurality of ARP packets, determining a potential gateway address; and
using the potential network address to attempt to communicate with the provisioning system via the potential gateway address;
wherein the information handling system is not communicatively coupled to a dynamic host configuration protocol (DHCP) server.

14. The article of claim 13, wherein the information handling system is a host system that has been added to a hyper-converged infrastructure (HCI) cluster.

15. The article of claim 13, wherein the receiving the ARP packets takes place in a promiscuous networking mode.

16. The article of claim 13, wherein the requests from the provisioning system are representational state transfer application programming interface (REST API) requests.

17. The article of claim 13, the instructions further executable for determining a netmask based on the contents of the plurality of ARP packets.

18. The article of claim 13, wherein the network addresses are internet protocol (IP) addresses.

* * * * *